United States Patent [19]

Smith

[11] Patent Number: 5,059,222

[45] Date of Patent: Oct. 22, 1991

[54] ENGINE AIR PRECLEANER

[76] Inventor: Daniel R. Smith, 1414 Birch St., Baraboo, Wis. 53913

[21] Appl. No.: 587,899

[22] Filed: Sep. 25, 1990

[51] Int. Cl.$^5$ .................. B01D 45/12

[52] U.S. Cl. .................. 55/309; 55/430; 55/439; 55/456

[58] Field of Search .................. 55/309, 430, 448, 449, 55/452, 456

[56] References Cited

U.S. PATENT DOCUMENTS

| | | | |
|---|---|---|---|
| 1,344,146 | 6/1920 | Peck | 55/459.1 |
| 1,434,562 | 11/1922 | Quam | 55/404 |
| 1,438,553 | 12/1922 | Quam | 55/404 |
| 1,870,216 | 8/1932 | Baldwin | 55/430 |
| 3,953,184 | 4/1976 | Stockford et al. | 55/458 |
| 3,973,937 | 8/1976 | Petersen | 55/449 |
| 4,020,783 | 5/1977 | Anderson et al. | 116/114 PV |
| 4,065,277 | 12/1977 | Dahlem | 55/418 |
| 4,201,557 | 5/1980 | Petersen | 55/327 |
| 4,373,490 | 2/1983 | Petersen | 55/328 |
| 4,388,091 | 6/1983 | Khosropour | 55/337 |
| 4,459,141 | 7/1984 | Burrington et al. | 55/430 |
| 4,547,207 | 10/1985 | Peterson | 55/430 |

*Primary Examiner*—Bernard Nozick

*Attorney, Agent, or Firm*—Andrus, Sceales, Starke & Sawall

[57] ABSTRACT

An engine air precleaner which is efficient at both low and high engine speeds as described. The precleaner has two air flow designs incorporated within it: one for a lower velocity of air flow and one for a high velocity of air flow. The dual air flow design is accomplished by an outer tubular sleeve member and an inner tubular sleeve member attached to an engine air intake stack. At low engine speeds, the air flow passes into the precleaner and through the inner tubular sleeve, causing the contaminant removal system to efficiently remove contaminants from the air. When the engine speed is increased, a valve opens allowing air to flow through tubular sleeve. Therefore, the contaminant removal system will operate substantially the same speed whether the engine is running at a lower or higher throttle.

10 Claims, 2 Drawing Sheets

ENGINE AIR PRECLEANER

FIELD OF THE INVENTION

The present invention is directed to air precleaners for engines, blowers or compressors, collectively referred to as engines, and specifically precleaners which are efficient at lower ends of engine speed.

DESCRIPTION OF THE PRIOR ART

It is well known that the introduction of air is necessary for the efficient operation of an internal combustion engine. Air intake pipes, or stacks, are generally located on the outside of the engine for carrying outside air to the engine. Prior to the introduction of air into the engine, it is desirable to remove as much of the contaminants or particulates from the air as possible. Undesirable contaminants include particulate matter such as dirt, dust, sand, snow and the like. Most engines include air filters in order to remove the contaminants. While air filters are effective in removing contaminants from the air that feeds the engine, engine air precleaners are also used. The advantages of engine air precleaners are extended filter life, improved fuel economy and extended engine life.

Air precleaners are well known to the art. Representative patents include U.S. Pat. Nos. 3,973,937; 4,201,557; and 4,373,940, all to Petersen. Other patents include U.S. Pat. No. 4,388,091 to Khosropour, which discloses an air cleaner with a suction closed seal in the bottom of the dust trap chamber. U.S. Pat. No. 4,020,783 to Anderson et al. discloses the use of a pressure differential between the inside and outside of an air cleaner to operate a filter condition indicator. U.S. Pat. Nos. 1,344,146 to Peck and 3,953,184 to Stockford et al., and 4,065,277 to Dahlem are directed to cyclonic dust separators.

Precleaners are generally located on the open inlet side of the air intake pipes or stacks. The function of the precleaner is to remove as much of the contaminant from the air as possible before it flows into the air filter media.

All precleaners operate on the principle of centrifugal separation. Most units operate on an air flow coming across a set of fixed vanes. Outside air, with its entrained contaminants, enters the precleaner from the vacuum created by the engine. The air and contaminants traverse a set of fixed static vanes, which cause the air to circulate at a great speed. The centrifugal force throws the contaminants and moisture to the outer wall of the precleaner. The contaminants follow the wall until they reach an area where they are discharged back into the atmosphere, or collected. Clean dry air then enters the filter elements.

As precleaners work on centrifugal separation, greater air flow velocity will result in better separation between air and contaminants. The best contaminant separation happens when the engine throttle power (expressed in revolutions per minute or R.P.M.) is at the high end causing a high velocity of the air flow coming into the precleaner. As the velocity of air flow decreases, the centrifugal force of the contaminants also decreases. The reduced air flow also diminishes the separation efficiency of the precleaner.

SUMMARY OF THE INVENTION

The present invention is designed to increase the efficiency of precleaners by incorporating a means for adapting two air flow capabilities within one precleaner: one for a lower velocity of air flow and one for a higher velocity of air flow.

The precleaner of the present invention includes a housing having a separation chamber. The separation chamber is defined by a generally tubular and vertical side wall surrounding the chamber. The side wall includes at least one discharge opening or port for providing a passageway for gas and particulates from the separation chamber. The precleaner also includes a vane assembly having at least one inlet passage angularly positioned for directing gas and particulates into the separation chamber in a circular direction. This movement is designed to force the particulates outwardly by centrifugal force, such that the particulates will leave the precleaner via the discharge opening. The engine precleaner also includes an outer tubular sleeve having a first end adapted to be mounted on the air intake stack of an engine and a second end extending into the separation chamber. The outer tubular sleeve is located concentrically with the separation chamber and has a side wall defining an outer tube chamber. The outer tubular chamber is adapted to carry gas separated from the particulates out of the separation chamber into the air intake stack. The engine precleaner also includes an inner tubular sleeve having a diameter somewhat smaller than the outer tubular sleeve and mounted concentrically within the outer tubular sleeve. The inner tubular sleeve has a side wall defining an inner tube chamber. The inner tube chamber is also adapted to carry gas separated from the particulates out of the separation chamber and into the outer tube chamber of the outer tube sleeve. Located between the second ends of the inner tubular sleeve and the outer tubular sleeve are means to seal the outer tube chamber from the separation chamber when the flow of gas is below a predefined pressure. A rotor assembly, including a drive fan assembly located in the outer tube chamber and an impeller assembly located in the separation chamber, acts to move the gas through the inner or outer tube chamber.

At low air volume, air is directed through the inner tube chamber which activates the rotation of the drive fan. The drive fan is connected to the impeller by a shaft and roller bearings. The purpose of the impeller is to direct contaminantss to the outer wall to be discharged. By directing the air flow through a smaller opening, such as the inner tube chamber, the velocity of the air is increased. The increased velocity will drive the drive fan at a higher revolution per minute (rpm) which also rotates the impeller at a higher rpm. Therefore, at low air flow intake, the air is forced through the smaller inner tube chamber due to the blockage of the outer tube chamber by the diaphragm or butterfly valve.

As the engine air flow increases, the increased air pressure on the system created will open the valve thus allowing air to pass through the larger opening. The force of the air speed on the drive fan remains substantially the same. Thus, the impeller will spin at the same speed whether the engine is running at a lower or higher speed. This creates better efficiency of particulate discharge removal at the lower ends of the engine speed.

The precleaner of the present invention is designed to be used in a flow-through, reverse flow or in-line designed precleaner. It can also be used with oil bath or dry element air filters. The precleaner can be used in all manner of vehicles, including vehicles used in agriculture, forestry and lumbering, off-highway construction, mining and gravel pits, stationary engines, marine shipyards, compressors, pneumatic blowers and highway maintenance equipment.

Further objects, features and advantages of the invention will be apparent from the following detailed description when taken in conjunction with the accompanying drawings.

DESCRIPTION OF THE PREFERRED EMBODIMENTS

The present invention eliminates the problem of lower efficiency in a precleaner at lower engine speeds by creating a precleaner with two air flow designs: one for a lower velocity of air flow and one for a higher velocity of air flow. The air precleaner has a comparatively small air intake unit for producing high velocities of air at low engine speeds. The higher velocity will cause a rotor assembly, including an impeller, to operate at a higher efficiency, thus effectively removing contaminants from the incoming gas. At higher engine speeds, the air flow entering the precleaner is increased. A butterfly or flap valve will open, thus allowing a greater in take of air through a larger chamber. The combination of the greater intake of air and the larger chamber maintains the air flow at substantially the same pressure on the rotor system as the lower air speed. Thus, the impeller will spin at substantially the same speed whether the engine is running at a low speed or a higher speed.

Figure 1:
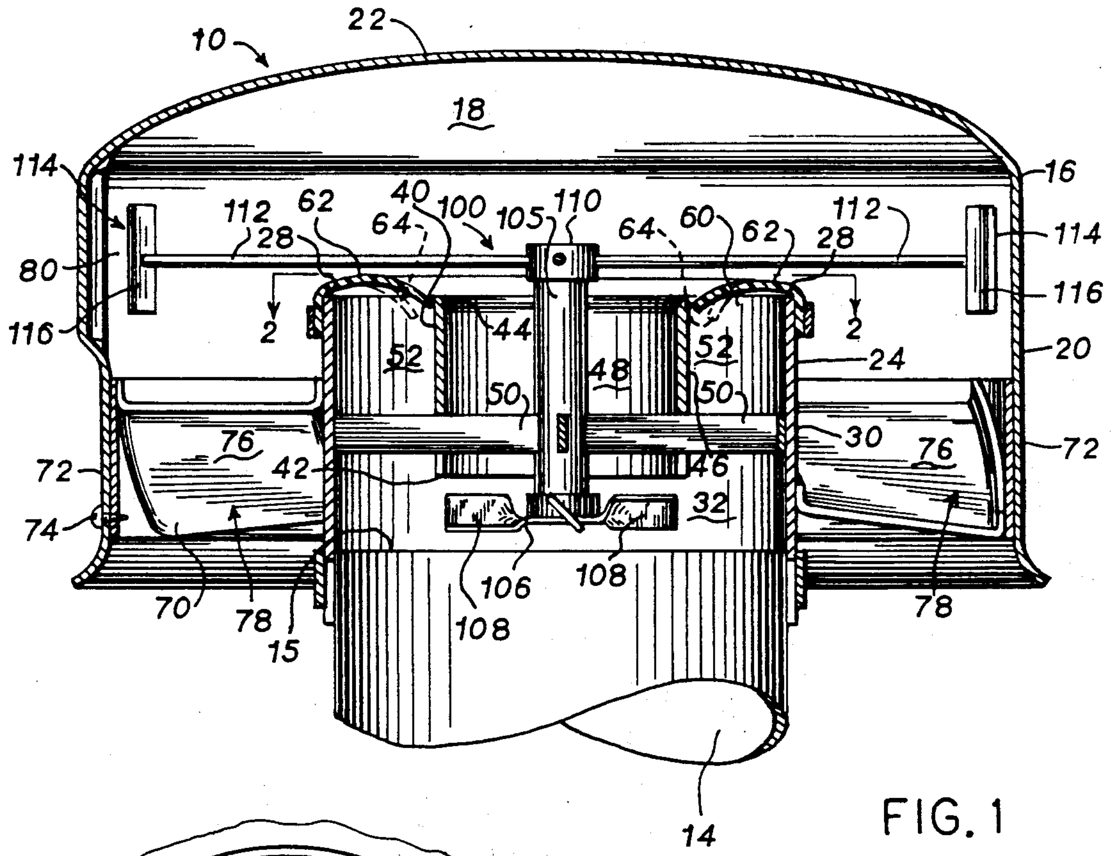
FIG. 1 is a side cross-sectional view of an engine precleaner of the present invention.
Figure 2:
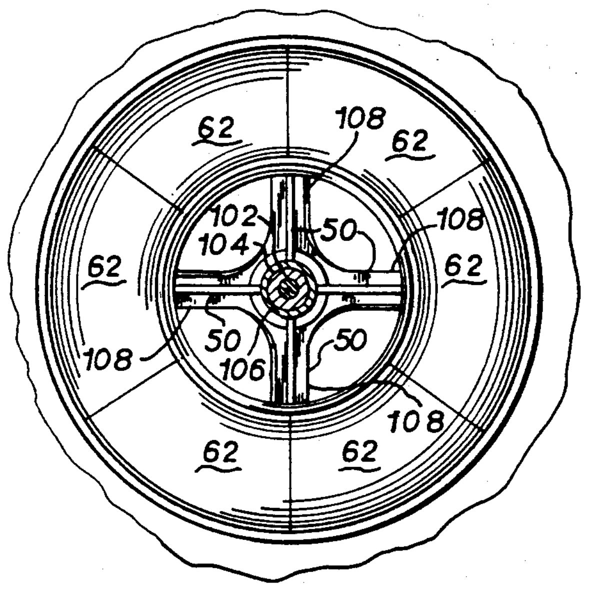
FIG. 2 is a sectional view taken along line 2—2 of FIG. 1.

Referring now to FIGS. 1 and 2, an engine precleaner 10 is mounted on air intake stack or pipe 12. The stack 12 has a passageway 14 for directing air, gas or like fluids from the mouth 15 of the stack 12 to a selected location. The precleaner 10 of the present invention is suitably designed for the removal of particulate matter, such as dust, dirt, snow and rain from a gas, i.e., air. While the precleaner 10 of the present invention has potential for use in a wide variety of applications, it is specifically designed for use with the air cleaner of an internal combustion engine.

The precleaner 10 includes a substantially tubular or cylindrical housing 16, which defines a separation chamber 18. The separation chamber 18 is a substantially open chamber wherein the particulates are removed from the gas. The housing 16 includes and upright cylindrical side wall 20 and a top wall 22. Both the side wall 20 and the top wall 22 can be made of the same piece of plastic or metal.

Located concentrically within the separation chamber 18 is an outer tubular sleeve 24 having a first end 26, which is adapted to be mounted on the mouth of the air intake stack 12, and a second end 28, which extends into the separation chamber 18. The outer tubular sleeve 24 includes a side wall 30, which defines an outer tube chamber 32. The outer tube chamber 32 is adapted to carry gas, such as air, which is separated from a substantial part of the contaminant particulates, out of the separation chamber 18 into the passage 14 of the air intake stack 12.

Mounted concentrically within the outer tubular sleeve 24 is an inner tubular sleeve 40 having a diameter smaller than the outer tubular sleeve 24. The inner tubular sleeve has a first end 42 extending into the outer tube chamber 32 and a second end 44 extending into and open to the separation chamber 18. The inner tubular sleeve 40 includes a side wall 46, which defines an inner tube chamber 48. The inner tubular sleeve 40 is positioned concentrically within the outer tubular sleeve 24 by means of supports 50, which connect the side wall 46 of the inner tubular sleeve 40 to the side wall 30 of the outer tubular sleeve 24 in such a manner as to not cause interference in the passage of air between the inner tubular sleeve side wall 46 and the outer tubular sleeve side wall 30. Thus, an air passageway 52 is defined in the outer tubular sleeve chamber 32 and between the inner tubular sleeve side wall 46 and the outer tubular sleeve side wall 30.

The air passageway 52 is also defined by an opening 60 between the separation chamber 18 and the outer tube chamber 32. The opening 60 is sealed by a valve 62 mounted on the side wall 30 of the outer tubular sleeve 24 or alternatively mounted on outside of wall 40. The purpose of the valve 62 is prevent the passage of air from the separation chamber 18 to the outer tube chamber 32 when the air flow between the separation chamber 18 and the outer tube chamber 32 is below a predefined pressure.

The valve 62 may be composed of a number of materials known to the art. For example, the valve 62 can be a butterfly valve, hingedly mounted to the side wall 30 of the outer tubular sleeve 24. As the pressure of air flow increases between the separation chamber 18 and the outer tube chamber 32, the force of air flow on the butterfly valve will cause it to open inwardly, as illustrated by the phantom lines 64 thus allowing air flow to enter the air passageway 52. Alternatively, the valve 62 can be made of a series of elastomeric or rubberized flaps, as illustrated in FIGS. 1 and 2, which will flex downwardly in the direction of the air passageway 52 thus allowing an opening between the separation chamber 18 and the air passageway 52 for air flow.

The precleaner 10 also includes a vane assembly 70 located at the lower portion of the cover 16 to provide air or gas inlet into the separation chamber 18. The vane assembly 70 includes a cylindrical frame 72 coextensive with and snugly fitted to the lower internal portion of the side wall 22 of the cover 16 and fastened thereto by suitable means, such as screws 74. The outer tubular sleeve 24 is secured to the frame 72 with a plurality of radially outwardly directed vanes 76 of the vane assembly 70. The vanes 76 are stationary and spaced from each other to provide inlet openings 78 around the outer tubular sleeve 24 to the outer area of the separation chamber 18. The vanes 76 are sloped or inclined upwardly in a circumferential direction to direct inlet air in an upward and circumferential or spiral direction into the separation chamber 18 in a manner known to the art. The circular motion of air in the separation chamber 18 establishes centrifugal forces on the contaminants entrained in the air to throwing the particles outwardly against the inner perimeter of the side wall 20 leaving clean air centrally located in the separation chamber 18. Air is moved through the inlet openings 78 in response to the low pressure or vacuum created in the passageway 14 of the stack 12 as air is drawn through the passageway 14 by the engine operation.

As illustrated in FIG. 1, the side wall 22 includes a vertically oriented discharge port 80 for the discharge of air carrying entrained contaminant matter, which has been forced toward the side wall 22 by centrifugal forces. The discharge port 80 is formed by an outward extension of the side wall 22. While it is contemplated that the discharge port 80 can have a variety of shapes, it is preferable that the discharge port 80 be vertically oriented to span the vertical expanse of the side wall 22, as illustrated in FIG. 1.

Once the particulate matter has been removed through the discharge port 80, the remaining "clean air," centrally located in the separation chamber 18, will be drawn into the passage 14 of the air intake stack 12 by either the inner tubular sleeve chamber 48 or the outer tubular chamber 32, in a manner which will be described hereafter, and then into the engine.

The precleaner 10 also contemplates a rotor assembly 100 partially located in the separation chamber 18 and partially located in the outer tube chamber 32. The rotor assembly 100 is mounted on a vertical shaft 102, illustrated in FIG. 2, and rotatably assembled to a bearing assembly 104 within a shaft sleeve 105 in a manner known to the art. A non-limiting example of such an assembly is illustrated in U.S. Pat. No. 3,973,937 to Petersen.

The rotor assembly 100 includes a drive fan 106 located in the outer tube chamber 32 at a position below the first end 42 of the inner tubular sleeve 40. The drive fan 106 is therefore in direct communication with the inner tube chamber 48 and the outer tube chamber 42 to take maximum advantage of the air flow produced by the vacuum created in the passageway 14 of the air stack 12 when the engine is in operation.

The drive fan 106 includes at least one and preferably four or more blades 108, which are rotatable in response to the air flow through the inner or outer tube chambers 48, 32.

The rotor assembly 10 also includes an impeller assembly 110, which is located on the shaft 102 at the end opposite the drive fan 106. The impeller assembly includes a plurality of arms 112, preferably four in number, equally spaced about a central collar 114. The collar 114 is fixedly attached to the shaft 103. Thus, when the shaft 102 rotates in response to the rotating action of the drive fan 106, the impeller assembly 110 will likewise rotate.

The ends 114 of each of the arms 112 are located at a point contiguous, but not touching, the inner face of the side wall 22. Secured to each end 114 is an elongate blade or paddle 116, preferably vertically oriented and forwardly curved in the direction of rotation of the drive fan blades 108. Each paddle 116 has a length slightly less than the length of the discharge port 80 to promote smooth air flow and reduce flow interference with the separation chamber walls. Upon rotation of the impeller assembly 110, the paddles 116 rotate next to the inside wall of the side wall 22, thus forcing the contaminants in the air toward the discharge port 80. The impeller assembly 110 rotates in response to the rotational movement of the drive fan 106, which is attached at the other end of the shaft 102.

In operation, air is drawn into the separation chamber 18 of the precleaner 10 through the vane assembly 70 in response to a vacuum or lower pressure created in the passageway 14 of the air stack 12 by the operation of the engine. As the air passes over the vanes 76 of the vane assembly 70, a circular motion is imparted to the air which enters the separation chamber 18. The circular motion imparted to the air creates centrifugal forces, which cause contaminants to be forced along the inner portion of the side wall 22. The relatively clean air passes in a circular or vortex-type flow through the inner tube chamber 48 or outer tube chamber 32 depending upon on the velocity of engine air flow.

At low air volume, i.e., the force of air produced when an engine is running at a lower speed, air is directed into and through the inner tube chamber 48, passing over the drive fan assembly 106. The force of the air passing through the narrow passageway, relative to the outer tuber chamber 32, of the inner tube chamber 48 will cause the drive fan assembly to rotate at a higher rpm than the air flow passing through the outer tube chamber 32, due to the pressure created by the air being forced through a smaller passageway. The increased velocity created by the smaller passageway of the inner tube chamber 48 will drive the drive fan 106 at a substantially higher rpm. This in turn drives the impeller assembly 110 at a higher rpm. Therefore, the force of air passing through the inner tube chamber 48 at a relatively lower air flow pressure will still force the impeller 110 to rotate at a high rpm therefore increasing it effectiveness in discharging contaminant particles through the discharge port 80 even when the engine is running at a reduced or idling speed.

As the engine air flow increases, due to a throttling up of the engine, the pressure created will open the valve 62, which will allow air to pass through both the inner tube chamber 48 and the air passageway 52. The increased opening size will lower the pressure on the drive fan assembly 106 created by the force of the air. Thus, the impeller 110 will not be forced to rotate at a higher rate of speed as the air flow increases.

In this manner, the impeller assembly 110 will rotate at approximately the same speed whether the engine is running at a low rate, i.e., approximately 300 cfm, or a high rate, i.e., approximately 800 cfm.

Figure 3:
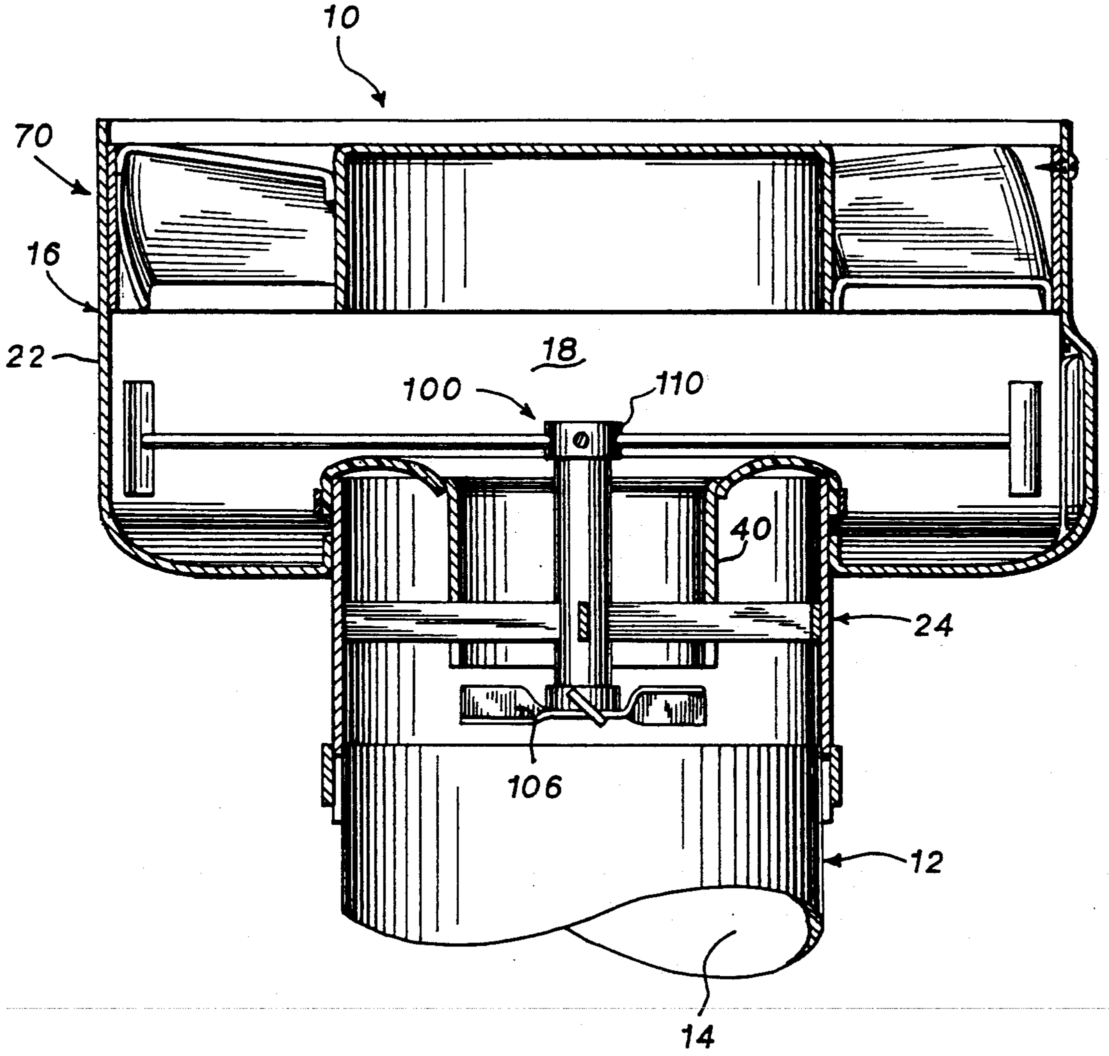
FIG. 3 is a side cross-sectional view of another embodiment of the precleaner of the present invention.

Referring now to FIG. 3, there is illustrated an alternative embodiment to the precleaner of the present invention. This embodiment is similar to the precleaner illustrated with respect to FIG. 1, with the exception that the vane assembly 70 is now positioned at a location above the rotor assembly 100; i.e, at the top of the cover 16 of the precleaner. Therefore, instead of having air being drawn from the bottom of the cover assembly 16, air is now drawn from the top. The manner of operation of the rotor assembly 100, the outer tubular 24 and the inner tubular sleeve 40 is the same.

It is understood that the invention is not confined to the particular construction and arrangement herein illustrated and described, but embraces such modified forms thereof as come within the scope of the following claims.

What is claimed is:

1. An engine precleaner adapted to be mounted on an engine air intake stack for separating unwanted particulates from particulate entrained gas, comprising:

a. a housing having a separation chamber, the housing including a generally tubular and vertical side wall surrounding the chamber, the side wall having a first upper end and a second lower end, the side wall further having at least one discharge opening for providing a passageway for gas and particulates from the separation chamber;

b. first end wall means attached to the side wall chamber;

c. second end wall means attached to the side wall at the other end of the separation chamber, the second end wall means having a vane assembly having at least one inlet passage angularly positioned for directing the gas and particulates into the separation chamber in a circular direction whereby the particulates move outwardly by centrifugal force;

d. an outer tubular sleeve having a first end adapted to be mounted on the air intake stack and a second end extending into the separation chamber to define an outer passage, the outer tubular sleeve located concentrically with the separation chamber and having a side wall defining an outer tube chamber, the outer tube chamber being adapted to carry gas separated from a substantial part of the particulates out of the separation chamber into the air intake stack;

e. an inner tubular sleeve having a diameter smaller than the outer tubular sleeve and mounted concentrically with the outer tubular sleeve and having a side wall defining an inner tube chamber, the inner tube chamber being adapted to carry gas separated from a substantial part of the particulates out of the separation chamber into the outer tube chamber of the outer tubular sleeve, the inner tubular sleeve having a first end extending into the outer tube chamber and a second end extending into and open to the separation chamber;

f. means to seal the outer passage from the separation chamber when the gas flow is below a predefined pressure; and g. a rotor assembly including a drive fan located in the outer tube chamber and an impeller assembly located in the separation chamber, the rotor assembly being effective to move gas and particulates through the discharge opening.

2. The precleaner of claim 1 wherein the drive fan includes a plurality of arms extending from the center of outer tube chamber radially outward toward the side wall of the outer tube chamber, and means rotatably mounting the arms of the housing for rotation in at least one direction about a vertical axis.

3. The precleaner of claim 1 wherein the impeller assembly includes a plurality of arms extending from the center of the separation chamber radially outwardly toward the side wall of the housing, means rotatably mounting the arms on the housing for rotation in at least one direction about a vertical axis, a paddle secured to the outer end of each arm for movement with the arm adjacent the inside of the side wall, whereby the paddles are effective upon rotation of the arms to move gas and particulates through the discharge opening.

4. The precleaner of claim 1, wherein the means to seal the outer passage from the separation chamber when the gas flow is below a predefined pressure includes a butterfly valve.

5. The precleaner of claim 1, wherein the means to seal the outer passage from the separation chamber when the gas flow is below a predefined pressure includes a flexible flap.

6. The precleaner of claim 1 wherein the first end wall means is attached to the first upper end of the side wall chamber of the housing and the second end wall means is attached to the second lower end of the side wall chamber of the housing.

7. The precleaner of claim 1 wherein the first end wall means is attached to the second lower end of the side wall chamber of the housing and the second end wall means is attached to the first upper end of the side wall chamber of the housing.

8. In an engine precleaner adapted to be mounted on an engine air intake stack, the precleaner comprising a housing having a separation chamber and at least one discharge opening for providing a passageway for gas and particulates from the separation chamber, a first end wall means attached to the side wall chamber, a second end wall means attached to the side wall at the other end of the separation chamber, the second end wall means having a vane assembly having at least one inlet passage angularly positioned for directing the gas and particulates into the separation chamber in a circular direction, and a rotor assembly including a drive fan and an impeller assembly, the rotor assembly being effective to move gas and particulates through the discharge opening, the improvement comprising:

a. an outer tubular sleeve having a first end adapted to be mounted on the air intake stack and a second end extending into the separation chamber to defined an outer passage, the outer tubular sleeve located concentrically with the separation chamber and having a side wall defining an outer tube chamber, the outer tube chamber being adapted to carry gas separated from a substantial part of the particulates at a predefined pressure out of the separation chamber into the air intake stack;

b. an inner tubular sleeve having a diameter smaller than the outer tubular sleeve and mounted concentrically with the outer tubular sleeve and having a side wall defining an inner tube chamber, the inner tube chamber being adapted to carry gas separated from a substantial part of the particulates out of the separation chamber into the outer tube chamber of the outer tubular sleeve, the inner tubular sleeve having a first end extending into the outer tube chamber and a second end extending into and open to the separation chamber; and c. means to seal the outer passage from the separation chamber when the gas flow is below the predefined pressure.

9. The precleaner of claim 8 where in the means to seal the outer passage from the separation chamber when the gas flow is below a predefined pressure includes a butterfly valve.

10. The precleaner of claim 8 where in the means to seal the outer passage from the separation chamber when the gas flow is below a predefined pressure includes a flexible flap.

* * * * *